(12) United States Patent
Wehrendt

(10) Patent No.: US 11,660,701 B2
(45) Date of Patent: *May 30, 2023

(54) LASER TOOL WITH A FOCUS ADJUSTMENT UNIT

(71) Applicant: Volkswagen Aktiengesellschaft, Wolfsburg (DE)

(72) Inventor: Christian Wehrendt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 301 days.

This patent is subject to a terminal disclaimer.

(21) Appl. No.: 16/503,934

(22) Filed: Jul. 5, 2019

(65) Prior Publication Data

US 2019/0321912 A1 Oct. 24, 2019

Related U.S. Application Data

(63) Continuation of application No. PCT/EP2017/078771, filed on Nov. 9, 2017.

(30) Foreign Application Priority Data

Jan. 5, 2017 (DE) ...................... 10 2017 200 081.3

(51) Int. Cl.
*B23K 26/08* (2014.01)
*B23K 26/352* (2014.01)
(Continued)

(52) U.S. Cl.
CPC .............. *B23K 26/08* (2013.01); *B23K 26/02* (2013.01); *B23K 26/106* (2013.01); *B23K 26/352* (2015.10); *B23K 2101/06* (2018.08)

(58) Field of Classification Search
CPC ...... B23K 26/08; B23K 26/02; B23K 26/106; B23K 26/352
See application file for complete search history.

(56) References Cited

U.S. PATENT DOCUMENTS 1,779,923 A * 10/1930 Wagner ................ B25D 11/066
74/61
4,839,495 A 6/1989 Kitera et al.
(Continued)

FOREIGN PATENT DOCUMENTS

CN 204934884 U 1/2016
DE 29506005 U1 8/1996
(Continued)

OTHER PUBLICATIONS

BeginnersGuide webpage (Year: 2016).*
(Continued)

*Primary Examiner* — Justin C Dodson
*Assistant Examiner* — Fahmida Ferdousi
(74) *Attorney, Agent, or Firm* — Muncy, Geissler, Olds & Lowe, P.C.

(57) ABSTRACT

In order to create a laser tool, in particular for the structuring of cylinder running surfaces, that offers the possibility of adjusting the focal position of the laser beam with high process reliability and with high repeatability, it is provided that the laser tool has a laser source for producing laser beams, a collimator for producing a parallel course of the laser beams from the laser source, which are passed through a lens that is located within a rotatable spindle, wherein an optical device for deflecting the laser beams onto a material surface is attached to an end of the spindle facing away from the laser source, wherein the collimator is movable parallel to the laser beam by means of a drive.

17 Claims, 4 Drawing Sheets

(51) Int. Cl.
*B23K 26/02* (2014.01)
*B23K 26/10* (2006.01)
*B23K 101/06* (2006.01)

(56) References Cited

U.S. PATENT DOCUMENTS

| | | | | |
|---|---|---|---|---|
| 5,113,291 | A | * | 5/1992 | Naiki .................... G02B 7/004 |
| | | | | 359/198.1 |
| 5,332,881 | A | * | 7/1994 | Topkaya .............. B23K 26/046 |
| | | | | 219/121.75 |
| 5,436,645 | A | * | 7/1995 | Uemura ............... G02B 26/128 |
| | | | | 346/107.1 |
| 7,564,006 | B2 | * | 7/2009 | Schwob ............... B23K 26/032 |
| | | | | 219/121.63 |
| 8,404,994 | B2 | | 3/2013 | Spennemann et al. |
| 9,969,029 | B2 | * | 5/2018 | Rominger .......... B23K 26/1462 |
| 2010/0072180 | A1 | | 3/2010 | Schuermann et al. |
| 2014/0216648 | A1 | | 8/2014 | Geiger et al. |
| 2016/0339541 | A1 | | 11/2016 | Spoerl et al. |

FOREIGN PATENT DOCUMENTS

| | | | | |
|---|---|---|---|---|
| DE | 29506005 | U1 | * 8/1996 | ............. B23K 26/10 |
| DE | 19809367 | A1 | 9/1999 | |
| DE | 19809367 | A1 | * 9/1999 | ......... B23K 26/0006 |
| DE | 202004017854 | U1 | * 1/2005 | ........... B23K 26/142 |
| DE | 202004017854 | U1 | * 3/2005 | ........... B23K 26/142 |
| DE | 202005016574 | U1 | 2/2007 | |
| DE | 10 2007 035 717 | A1 | 7/2008 | |
| DE | 102008015403 | A1 | 9/2009 | |
| DE | 102011081554 | A1 | 2/2013 | |
| EP | 0300458 | A1 | 1/1989 | |
| EP | 0306456 | A1 | * 3/1989 | ............. B23K 26/04 |
| EP | 306456 | A1 | * 3/1989 | |
| EP | 1716963 | A1 | 11/2006 | |
| JP | S5838689 | A | 3/1983 | |
| JP | S6163387 | A | 4/1986 | |
| JP | 2010036240 | A | 2/2010 | |
| JP | 2012024781 | A | 2/2012 | |
| JP | 2012086903 | A | 5/2012 | |
| KR | 20120126787 | A | 11/2012 | |

OTHER PUBLICATIONS

Britannica.com (Year: 2016).*
RW article (Year: 2014).*
Collimation webpage (Year: 2016).*
Electrical4u webpage (Year: 2016).*
U.S. Appl. No. 16/504,018, filed Jul. 5, 2019.
International Search Report dated Mar. 5, 2018 in corresponding application PCT/EP2017/078771.
International Search Report dated Jan. 10, 2018 in co-pending application PCT/EP2017/073188.
International Preliminary Report on Patentability dated Jul. 9, 2019 in co-pending application PCT/EP2017/073188.

* cited by examiner

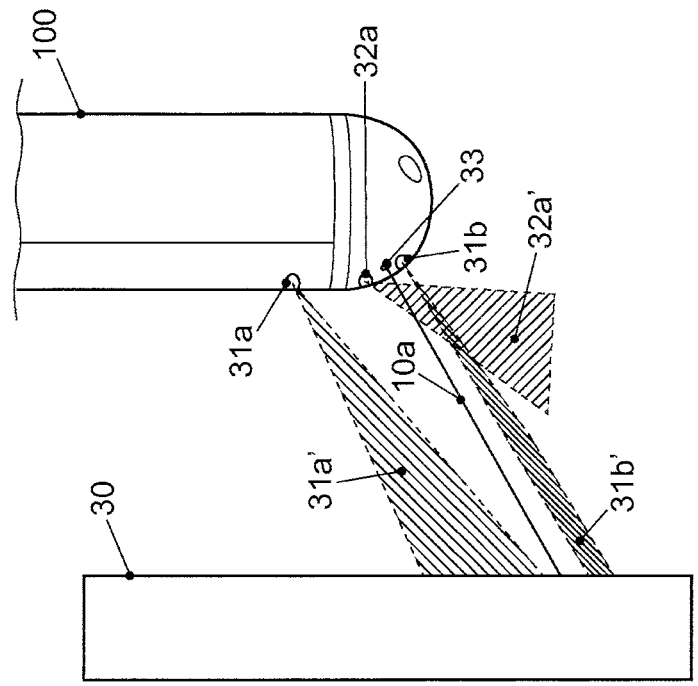
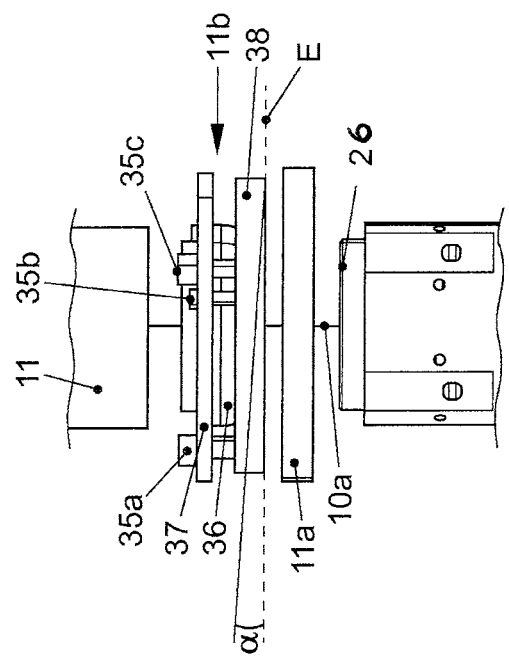
FIG. 3
FIG. 2

LASER TOOL WITH A FOCUS ADJUSTMENT UNIT

This nonprovisional application is a continuation of International Application No. PCT/EP2017/078771, which was filed on Nov. 9, 2017, and which claims priority to German Patent Application No. 10 2017 200 081.3, which was filed in Germany on Jan. 5, 2017, and which are both herein incorporated by reference.

BACKGROUND OF THE INVENTION

Field of the Invention

The present invention relates to a laser tool, in particular for the structuring of cylinder running surfaces, having a focus adjustment unit, and also relates to a method for adjusting the focal position of laser beams in a laser tool.

Description of the Background Art

Laser tools are used in automotive engineering for processing and for structuring of material surfaces. In particular, laser tools are employed in introducing small structures on cylinder running surfaces. In laser tools known from the prior art, a laser beam generated in a laser source is guided onto the material surface through a series of optical elements and is focused there, wherein the laser beam is rotated by a rotatable device.

The correct position of the focus of the laser beam is crucial for an optimal processing result in this case, with the repeatability of the focus adjustment, in particular, being of great importance. To date, the correct focal position is set manually as a general rule, and is not adjustable during the ongoing process. The manual adjustment is accomplished here through screws located on the optical element, by means of which the optical element can be clamped at various positions in the beam path.

The manual clamping of the optical element by means of screws entails the risk that the optical element is fastened at an angle in the beam path, thus causing the optical path, in particular the focal position, to change. Moreover, high repeatability is not guaranteed in this process when the laser tool is to be set to the same cylinder diameter. In particular, this process does not make it possible to set the laser tool to other cylinder diameters during the ongoing process or to respond to changes in the focal position.

Known from DE 10 2008 015 403 A1 is a laser beam tool for finishing an inner surface of a workpiece hole, in particular a cylinder running surface, wherein the laser beam tool is attached to a hollow machine spindle that can rotate and, in particular, be raised and lowered, and wherein an optical device for deflecting the laser beam onto the workpiece surface is adjustable relative to the machine spindle so that the laser beam can be moved independently of the motion of the machine spindle. In this design, provision is made in particular that a rotary motion of the optical device that is opposite the rotary motions of the machine spindle can be superimposed with the aid of the adjusting device in order to deflect the laser beam onto the workpiece surface. The intent of this design is to extend interaction times between the laser beam and the material surface to be processed so that the incorporation of free structures is made possible.

SUMMARY OF THE INVENTION

It is therefore an object of the present invention to provide a laser tool that offers the possibility of adjusting the focal position of the laser beam with high process reliability and high repeatability.

In an exemplary embodiment of the invention, a laser tool is provided, in particular for the structuring of cylinder running surfaces, that has a laser source for producing laser beams and a collimator that produces a parallel course of the laser beams from the laser source. In addition, the laser tool has a lens that is located within a rotatable spindle. The parallel laser beams from the collimator are passed through this lens and then deflected onto the material surface by an optical device that is attached to the end of the spindle facing away from the laser source. In this design, the collimator is movable parallel to the laser beam by means of a drive.

As a result of the movement of the collimator with the aid of a drive along the direction of the laser beam, it is possible in an advantageous way to adjust the position of the focus of the laser beam without the manual intervention of an operator being required. Moreover, the collimator is guided in the beam path in a stable manner.

The drive can be an electric drive, a pneumatic drive, or a hydraulic drive. Especially preferably, the drive is a servomotor.

The drive can have a linear measuring system as an external position sensor for detecting the position of the collimator. The movement of the collimator parallel to the direction of the laser beam can be accomplished by means of a ball-screw drive, for example. The linear measuring system is connected to the drive or is integrated into the drive.

The drive can have a control device for controlling the movement of the collimator. It is consequently possible to control the movement of the collimator on the basis of at least one predefinable parameter. In addition, the control device processes the signals of the linear measuring system.

The process reliability and the repeatability are advantageously increased as a result of the fact that the movement of the collimator is controlled through predefinable parameters. Furthermore, the focal position can be set especially precisely for different cylinder diameters. In particular, it is possible to store the parameters for different cylinder diameters in a memory provided in the controller so that they can be retrieved directly during operation without manual changeover.

The at least one parameter can be the feed of the collimator toward the optical device or the feed of the collimator toward the laser source. In this context, a feed of the collimator toward the optical device can mean an advancing of the focus toward the material surface, and analogously, a feed of the collimator toward the laser source can mean a moving of the focus away from the workpiece surface.

Also, the laser tool can have at least a lower stop that delimits the movement of the collimator in the direction of the optical device. In addition, provision is made according to another embodiment that the laser tool has at least an upper stop that delimits the movement of the collimator in the direction of the laser source.

The lens can be arranged in a fixed position in a lens tube. Due to the fixed arrangement of the lens in the lens tube, the lens remains stationary relative to the rotation of the spindle during the treatment process, since it is not connected thereto. As a result of the fact that the lens does not rotate with the spindle, but instead is arranged so as to be stationary in the lens tube, the stability in the optical path is improved, and thus also the focal position of the laser beam.

The lens can be attached to the lens tube, wherein the lens tube is attached to the collimator. As a result, the lens, the lens tube, and the collimator form a unit that can be moved parallel to the laser beam by means of the drive, and thus serves to set the focal position of the laser beam. As a result of the fact that the collimator and the lens are fixed with respect to one another in this arrangement, the laser beam guidance is optimized and more accurate positioning of the laser focus is made possible.

The spindle can be rotated via a hollow-shaft motor, wherein the spindle is attached to the rotor of the hollow-shaft motor.

The optical device can be a reflecting prism or a mirror. This is attached to an end of the spindle facing away from the laser source, and thus rotates with the spindle in order to travel the material surface by means of the rotation. The reflecting prism or the mirror is fastened by means of multiple screws in a holder that is attached to the spindle. However, other optical elements that are designed for deflecting a laser beam, for example a mirror or prism, are also possible.

The laser tool can have a control unit that controls the motion of the collimator in the process as a function of a signal from a sensor. A sensor of this nature could measure the intensity of the laser spot and compare it with a target value or a threshold, for example. When such a target value or threshold is exceeded or fallen below, the drive automatically readjusts the position of the collimator, and thus the location of the laser beam focus. This has the consequence that the surface has a better surface structure according to the preselected parameters. Moreover, the cost effectiveness of the system rises, since the intensity of the laser source can be adapted to the environmental influences and the system is calibrated continuously.

In addition, the invention relates to a method for setting the focal position of laser beams in a laser tool according to the present invention. The laser tool has a laser source for producing laser beams and a collimator for producing a parallel course of the laser beams. The laser beam is passed through a lens, wherein the lens is arranged inside a rotatable spindle. The laser beam is then passed through an optical device that is located at the end of the spindle facing away from the laser source and that deflects the laser beams onto a material surface. The collimator is movable parallel to the laser beam by means of a drive, and at least one parameter is predefined by means of a controller that controls the motion of the collimator, wherein the collimator is moved in the direction of the optical device or opposite to the direction of the optical device as a function of the at least one parameter.

The at least one parameter can be the feed of the collimator toward the optical device or the feed of the collimator toward the laser source.

The laser tool additionally can have a tilting device via which the collimator can be tilted. In particular, the collimator can be tilted out of at least one plane that encloses an angle a with the X-Y plane and into the X-Y plane. The tilting device also serves to compensate for manufacturing tolerances of the collimator and an unintended angular displacement of the collimator with respect to the lens after a replacement of the collimator.

After the first installation of the collimator, or also after a replacement, the problem may arise that the collimator is in an inclined position with respect to the lens. As a result, the laser beam is not optimally focused. Such an inclined position can advantageously be compensated for by means of the tilt device after the installation or replacement of the collimator.

The tilting device has a hemispherical element that is attached by its flat side to the collimator. The hemispherical element additionally has a circumferential annular projection, through which tilt screws are passed. On the side facing away from the collimator, the hemispherical element is inserted into the central opening of an annular supporting part, wherein the tilt screws arranged on the hemispherical element or on the annular projection are screwed to the annular supporting part, thus fastening the hemispherical element to the annular supporting part. The hemispherical element also has a central through hole, through which the laser beam is passed. After passage through the through hole, the laser beam goes through the central opening of the annular supporting part.

Via the mounting of the hemispherical element in the annular supporting part, a change in the position of the collimator with respect to the laser beam and the lens can be accomplished by tightening and loosening the screws. In particular, the collimator can be tilted by an angle a from an inclined position into the X-Y plane.

For tilting the collimator, three tilt screws, for example fine-thread screws, can be provided that are distributed uniformly along the circumferential area of the annular projection of the tilting device. Tightening one of the tilt screws causes the collimator to tilt in the direction of the applicable tilt screw, since the hemispherical component moves in the annular supporting element in the manner of a ball joint. If a collimator was installed at an angle in the beam path during replacement, for example, which is to say tilted relative to the X-Y plane by an angle a, the position of the collimator can be changed by tightening the tilt screws until the collimator is once again located in the X-Y plane.

Advantageously, spacer washers with a defined thickness can be provided that are inserted around the screw threads between the circumferential ring-like projection and the annular supporting part in order to be able to implement a defined and reproducible length of thread engagement. With the aid of the tilting device, it is advantageously possible to be able to readjust the position of the collimator at any time in order to be able to ensure at all times that the laser beam optimally strikes the lens.

The laser tool can have a centering device for moving the collimator in a plane perpendicular to the laser beam. Via the centering device, the collimator can be adjusted in the X- and Y-directions, wherein the X-direction and the Y-direction span a plane perpendicular to the laser beam, which runs in the Z-direction. The centering device serves to compensate for manufacturing tolerances of the collimator and an unintended parallel displacement of the collimator with respect to the lens after a replacement of the collimator. After the first installation of the collimator, or also after a replacement, the problem may arise that the collimator is no longer centered on the transverse axis with respect to the lens. As a result, the laser beam is not optimally focused. Such a displacement in the X-Y plane can advantageously be compensated for by means of the centering device after the installation or replacement.

For this purpose, the centering device has at least two centering screws, wherein a first centering screw is arranged along the X-direction and a second screw is arranged along the Y-direction. A tightening of the centering screws causes the collimator to be moved in the X- or Y-direction. In particular, tightening the centering screws brings about a movement of the centering device connected to the collimator. In addition, a third centering screw can be provided, by means of which the collimator can be moved in a direction along a screw rotated by 45° with respect to the first and second centering screws.

The centering device can include two platelike components, wherein the first platelike component is attached to the sleeve, and the second platelike component is attached to the collimator. For centering the collimator, these two platelike components can be moved toward one another. For this purpose, the centering screws extend through holes in the first platelike component, and when the centering screws are tightened or loosened, a movement of the second platelike component, and hence of the collimator, takes place along the longitudinal direction of the screw in question. The longitudinal direction of the centering screws in this context corresponds to the X-direction or the Y-direction or a direction 45° thereto.

In order to be able to move the collimator by a desired, predetermined distance, spacer washers can be provided that are inserted between the screw in question and the first or second platelike component. A tightening of the screws is then possible until the first or second platelike component strikes the spacer washers.

In order to permit the movement of the first platelike component with the second platelike component only during the adjustment of the laser tool, and otherwise to establish a fixed connection of the two platelike components, in particular during operation of the laser tool, the first and the second platelike component can be immovably connected to one another by means of at least one locking screw. The at least one locking screw in this design preferably extends through a through bore in the first platelike component, and is screwed into the second platelike component for the purpose of locking in place.

It is thus possible for the collimator connected to the centering unit to be adjusted via the centering device in such a way that the laser beam that is passed through the collimator strikes the lens optimally. As a result, the laser beam is guided precisely in the beam path, which advantageously improves the quality of the workpiece processing.

The tilting device can be arranged between the side of the collimator facing the optical device and the centering device.

The laser tool can have a first nozzle system, wherein the first nozzle system has at least one air nozzle, in particular at least two air nozzles. By means of the at least one air nozzle, the laser beam emerging from the laser tool is surrounded with an airflow in such a manner that workpiece particles removed from the workpiece surface by the laser beam are slowed down and/or that the air jet of the at least one air nozzle is directed at the material surface in order to clean the material surface.

By cleaning the material surface before the laser beam strikes, the processing result can advantageously be improved.

The first nozzle system includes a first air nozzle and a second air nozzle, which are arranged on the laser tool on opposite sides of the exit aperture of the laser beam. As a result, a precleaning and/or postcleaning of the workpiece surface is advantageously possible. One air jet apiece emerges from the first air nozzle and the second air nozzle, each of which air jets is conical in design and is directed at the material surface. Consequently, the two air jets form an air curtain around the laser beam, at least in sections, preventing highly accelerated workpiece particles from being emitted into the vicinity of the laser tool. This is accomplished by the means that the workpiece particles strike the air jet, are carried along by it, and are slowed down by the change in direction.

In addition to the first air nozzle and the second air nozzle, it is advantageously also possible to provide other air nozzles, which are arranged around the exit aperture of the laser beam in order to thus enlarge and/or intensify the air curtain.

The laser tool can have a second nozzle system, wherein the second nozzle system has at least one third air nozzle whose air jet proceeds the laser beam in such a manner from a laser beam exit aperture of the laser tool that an ingress of particles into the interior of the laser tool through the laser beam exit aperture is prevented. The third air nozzle is advantageously arranged such that the air jet emerging from it crosses the laser beam. In order to prevent the ingress of particles into the interior of the laser tool especially effectively, the third air nozzle is advantageously arranged close to the laser beam exit aperture and encloses a large angle with the laser beam. As a result, an air curtain is formed close to the laser beam exit aperture. If a particle, in particular a removed workpiece particle, now moves toward the laser beam exit aperture, said particle is deflected essentially crosswise to the laser beam direction by the air jet. As a result, a contamination of the interior of the laser tool, in particular of the optical device, can be prevented advantageously.

The laser tool can have an oscillation generating device, via which the lens can be placed in oscillation parallel to the laser beam, wherein the oscillation frequency can be controlled as a function of the rotational speed of the spindle. Due to the oscillation of the lens parallel to the laser beam, which is to say in the Z-direction, the location of the focus of the laser beam is also shifted toward or near the workpiece surface with the motion of the lens. Fine structures can be created in this way on the workpiece surface during the rotation of the laser tool. In particular, periodically occurring indentations can be achieved in the workpiece surface, wherein each indentation corresponds to an oscillation maximum of the lens. The distance between two indentations is determined by the rotational speed of the laser tool. Through rotation-guided focus adjustment using frequencies, moreover, the distances between the structures created can be determined in a qualified way by means of the rotational speed and the frequency of the oscillation produced. Through the incorporation of fine structures into the workpiece surface, its properties, in particular its adhesion to other materials, can be improved advantageously. This is especially advantageous in processing the inner surfaces of engine blocks when they are provided with a coating, for example.

The oscillation generating device can include a magnet and a coil, wherein the lens is placed in oscillation by means of the magnet and the coil. The coil is connected to the lens, and is arranged in the field of the magnet. Analogously to the excitation of oscillations of a membrane in a loudspeaker, a motion in the Z-direction of the coil and of the lens arranged on the coil is achieved through the flow of current through the coil on account of the Lorentz force. In this way, a periodic motion of the lens, and thus of the focus, in the Z-direction can be achieved in order to incorporate structures in the workpiece surface along the line of rotation of the laser tool, as already discussed above.

The oscillation generating device can have a high-frequency motor and an eccentric, wherein the motor drives the eccentric. The eccentric is connected to the lens in such a manner that the lens is placed in oscillation in the Z-direction.

The lens can be arranged to be stationary in a lens tube that is attached to the collimator, so the lens follows the motion of the collimator.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is an exploded view of the tilting device and centering device located between collimator and sleeve, FIG. 3 is a side view of the first nozzle system and of the second nozzle system.

DETAILED DESCRIPTION

Figure 1:
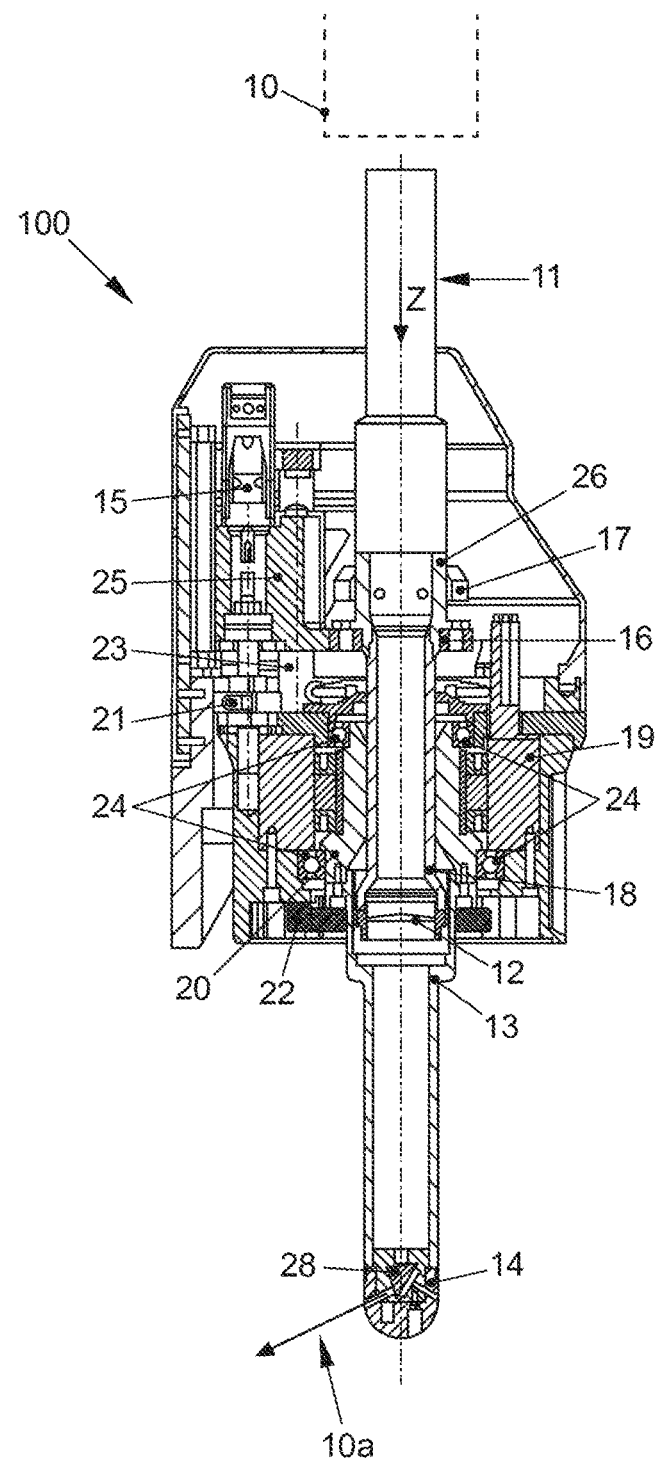
FIG. 1 is a cross-sectional representation of the laser tool.

FIG. 1 shows the laser tool (100) in a cross-sectional representation. The fiber of the laser source (10) is connected to the laser tool (100) by the collimator (11). The collimator (11) is attached to a stationary sleeve (26), which is connected to the drive (15) by an adjustment angle (25). The drive (15) travels along a guide shaft (23) by means of a recirculating ball screw (21). Also attached to the sleeve (26) is a lens tube (18); attached to the end of the lens tube that faces away from the sleeve (26) is the lens (12). The optical path of the laser beam (10a) from the laser source (10) extends in this design through the collimator (11), the sleeve (26), the lens tube (18), and the lens (12) to an optical device (14).

The unit includes a laser source (10), collimator (11), sleeve (26), lens tube (18), and lens (12) is connected to the drive (15) by the adjustment angle (25), and can thus be moved as a unit parallel to the laser beam. The movement of this focusing unit is delimited by an upper stop (17) and a lower stop (16).

The laser tool (100) additionally has a control device for controlling the motion of the collimator (11). In order to control the motion of the collimator (11), one or more parameters can be specified, thus for instance, the feed of the collimator (11) in the direction of the optical device (14) or the feed of the collimator (11) in the direction of the laser source (10) can be specified. In addition, the laser tool (100) has a control unit that controls the motion of the collimator (11), and thus the focal position, as a function of a signal which originates from a sensor, for example, in the process and calibrates the system with regard to the focal position.

For rotation of the laser beam, the laser tool (100) has a spindle (13), which is attached to the hollow shaft (20) of a hollow-shaft motor (19) and is driven by this hollow-shaft motor (19). In this design, the lens tube (18) and the lens (12) are arranged inside the hollow shaft (20). All components of the hollow-shaft motor (19) are supported by bearings (24).

The optical device (14) is attached to the end of the spindle (13) that faces away from the hollow-shaft motor (19). The optical device (14) rotates together with the spindle (13). The optical device (14) includes a reflecting prism (28) or a mirror, which deflects the laser beam (10a) onto the workpiece surface (30). Also arranged in the vicinity of the spindle is a sensor (22), which checks the position of the spindle, and thus of the laser beam (10a).

FIG. 2 shows the tilting device (11b) and the centering device (11a), which are located between the collimator (11) and the sleeve (26), in an exploded view. Along the direction of propagation of the laser beam (10a), the tilting device (11b) is arranged behind the collimator (11) and ahead of the centering device (11a). The centering device (11a) is arranged behind the tilting device (11b) and is attached to the sleeve (26), for example by means of screws. By means of the tilting device (11b), the collimator (11) can be tilted from an inclined position with respect to the laser beam (10a) by the angle a into a plane (E) perpendicular to the laser beam (10a). The tilting of the laser beam (10a) is achieved by tightening and loosening the tilt screws (35a, 35b, 35c).

The tilting device (11b) has a hemispherical element (36) that is attached by its flat side to the collimator (11). Arranged on the hemispherical element (36) is a circumferential annular projection (37) with through bores, wherein the tilt screws (35a, 35b, 35c) are passed through the through bores. The tilt screws (35a, 35b, 35c) are screwed into an annular supporting part (38), wherein the hemispherical element (36) is mounted in the central opening of the annular supporting part (38) in such a manner that the hemispherical element (36) can move in the manner of a ball joint. The tilting device (11b) is preferably secured by connecting screws (41a, 41b, 41c) to the centering device (11a) (see FIG. 5).

FIG. 3 shows the first nozzle system and the second nozzle system, which are arranged close to the laser beam exit aperture (33) of the laser tool. The first nozzle system includes at least one air nozzle (31a), which is arranged above the laser beam exit aperture (33) and an air nozzle (31b) which is arranged below the laser beam exit aperture (33). The air jet (31a') emerging from the air nozzle (31a) is conical in design and is directed at the workpiece surface (30), wherein the air jet (31b') runs approximately parallel to the laser beam (10a) and does not intersect it.

In order to prevent the ingress of particles into the interior of the laser tool through the laser beam exit aperture (33), the second nozzle system is provided that includes air nozzle (32a) whose air jet (32a') is located in front of the laser beam exit aperture (33) in such a manner that an air curtain is formed in front of the laser beam exit aperture (33). For this purpose, the air jet (32a') crosses the laser beam (10a) in an area near the laser beam exit aperture (33). This system is also suitable for sealing off the opening of the laser after the treatment process in order to deflect airborne particles or to keep them from entering the system.

Figure 4:
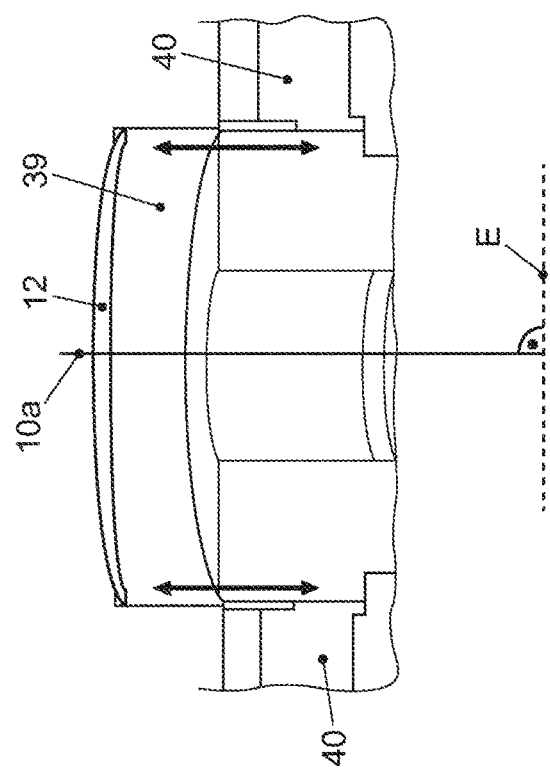
FIG. 4 is a cross-sectional view perpendicular to the laser beam of the oscillation generating device.

In FIG. 4, an oscillation generating device that places the lens (12) in oscillation is shown in a cross-sectional view through the laser beam (10a) and perpendicular to the X-Y plane (E). The oscillation generating device includes a current-carrying coil (39) and a magnet (40). By means of the current-carrying coil (39) that moves in the field of the magnet (40), the lens (12) located on the coil (39) can be placed in oscillation. The oscillation takes place in the Z-direction, parallel to the laser beam, as indicated by the arrows, via which a change in the position of the focus relative to the workpiece surface is possible in such a manner that fine structures can be incorporated in the workpiece surface.

Figure 5:
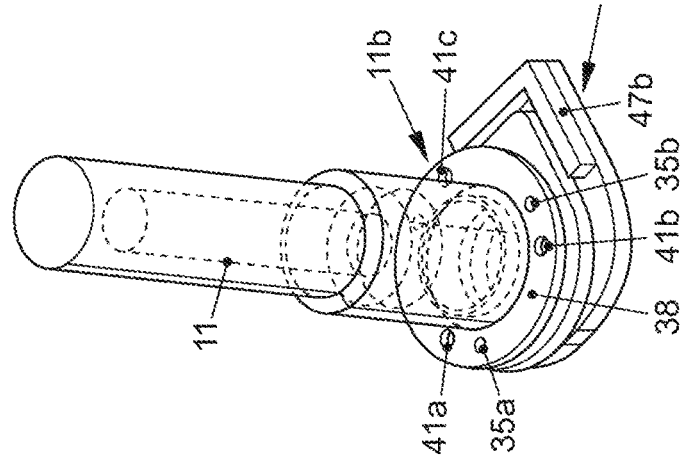
FIG. 5 is an oblique view from above of the collimator with tilting device and centering device arranged thereon.

FIG. 5 shows the collimator (11) with the tilting device (11b), which is located on the end of the collimator (11) facing away from the laser source (10). The tilting device (11b) is attached to the centering device (11a) by means of three connecting screws (41a, 41b, 41c) that are passed through holes in the annular supporting part (38) and preferably are implemented as lock screws, so that the tilting device (11b) is located between the collimator (11) and the centering device (11a). Three additional screws that are passed through holes in the annular supporting part (38) in the tilting device (11b) are the tilt screws (35a, 35b, 35c) (see also FIG. 2). The position of the collimator (11), and thus of the laser beam (10a), relative to the plane (E) can be changed by loosening and tightening the tilt screws (35a, 35b, 35c).

Figure 6:
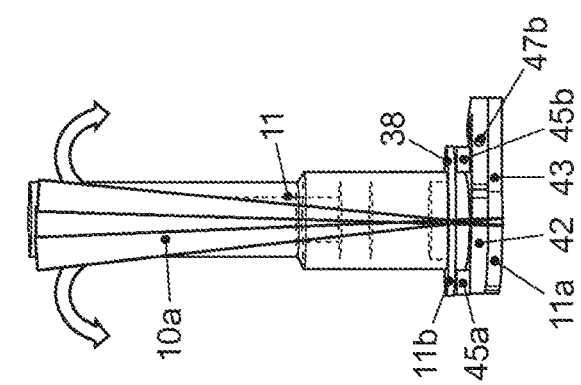
FIG. 6 is a side view of the collimator with tilting device and centering device arranged thereon.

In FIG. 6, the unit including the collimator (11), centering device (11a), and tilting device (11b) is shown in a side view. At least one first spacer (45a, 45b) is located between the annular supporting part (38) of the tilting device (11b) and a first displacement part (42) of the centering device (11a), which is connected to the collimator (11) by means of the connecting screws (41a, 41b, 41c). A precisely defined and reproducible adjustment of the collimator (11) can occur with high repeatability by means of the at least one first spacer (45a, 45b). By tilting the collimator (11), the laser beam (10a) can be adjusted in the directions indicated by the arrows.

Figure 7:
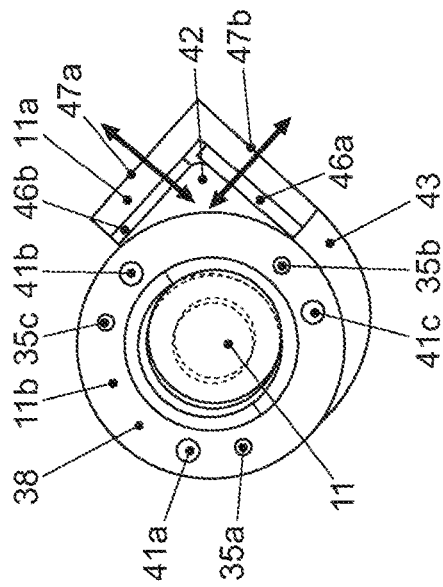
FIG. 7 is a top view of the collimator with tilting device and centering device arranged thereon.

FIG. 7 shows the centering device (11a), the tilting device (11b), and the collimator (11) in a top view, wherein the collimator (11) is shown in a cross-section through the collimator (11). The adjustment of the collimator (11) or of the laser beam (10a) is achieved by moving the first and second displacement parts (42, 43) of the centering device relative to one another. For this purpose, two centering screws (47a, 47b) are provided that are passed through holes in a projection in the second displacement part (43) and, by tightening, the second displacement part (43) is moved relative to the first displacement part (42), to which the collimator (11) is connected by the tilting device (11b). By means of the centering screws, therefore, a movement of the collimator in the X- or Y-direction indicated by the arrows is achieved. In like manner here, at least one second spacer (46a, 46b) can be arranged between the first displacement part (42) and the second displacement part (43) in order to permit a movement by a defined distance.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A laser tool for structuring cylinder running surfaces, the laser tool comprising:
a laser source for producing a laser beam;
a collimator that provides a course of the laser beam from the laser source, wherein the laser beam is passed through a lens that is located within a rotatable spindle;
an optical device to deflect the laser beam onto a material surface, the optical device being attached to an end of the spindle facing away from the laser source;
a lens tube that is non-rotatable, the lens tube having a first end facing towards the laser source and a second end facing towards the optical device, wherein the lens is attached inside the second end of the lens tube and the second end of the lens tube is disposed inside an end of the spindle facing towards the laser source; and
a sleeve, wherein the sleeve is positioned between the collimator and the lens tube such that a first end of the sleeve faces toward the collimator and a second end of the sleeve faces toward, and is non-rotatably attached directly to, the first end of the lens tube,
wherein the collimator, the sleeve and the lens tube are movable parallel to the laser beam via a drive,
wherein the collimator has a first end facing towards the laser source and a second end facing towards the first end of the sleeve,
wherein the laser tool further comprises a centering device for moving the collimator in an X-Y plane that is perpendicular to the laser beam, and
wherein the centering device is positioned toward the second end of the collimator and is attached to the first end of the sleeve.

2. The laser tool according to claim 1, wherein the drive is an electric drive, a servomotor, a pneumatic drive, or a hydraulic drive.

3. The laser tool according to claim 1, wherein a movement of the collimator is based on at least one predefinable parameter.

4. The laser tool according to claim 3, wherein the at least one predefinable parameter is a feed of the collimator toward the optical device or a feed of the collimator toward the laser source.

5. The laser tool according to claim 1, wherein the laser tool has at least a lower stop and/or an upper stop that delimit the movement of the collimator.

6. The laser tool according to claim 1, wherein the lens is arranged in a fixed position in the lens tube.

7. The laser tool according to claim 1, wherein the spindle is rotated by a hollow-shaft motor, and wherein the spindle is attached to a rotor of the hollow-shaft motor.

8. The laser tool according to claim 1, wherein the optical device includes a reflecting prism or a mirror.

9. The laser tool according to claim 1, wherein the laser tool has a tilting device via which the collimator is tilted at an angle with respect to the X-Y plane.

10. The laser tool according to claim 9, wherein the tilting device is arranged towards the second end of the collimator and is attached to the centering device.

11. The laser tool according to claim 1, wherein the laser tool has a first nozzle system, wherein the first nozzle system has at least two air nozzles that surround the laser beam that has emerged from the laser tool with air jets such that workpiece particles removed from the workpiece surface by the laser beam are slowed down and/or the air jets of the at least two air nozzles are directed at the workpiece surface in order to clean the workpiece surface.

12. The laser tool according to claim 11, wherein the laser tool has a second nozzle system, wherein the second nozzle system has at least one air nozzle whose air jet crosses the laser beam outside of a laser beam exit aperture of the laser tool such that an ingress of particles into an interior of the laser tool through the laser beam exit aperture is prevented.

13. The laser tool according to claim 1, wherein the laser tool has an oscillation generating device, via which the lens is placed in oscillation parallel to the laser beam, and wherein an oscillation frequency is controlled as a function of a rotational speed of the spindle.

14. The laser tool according to claim 13, wherein the oscillation generating device is a system comprising a coil and a magnet.

15. A method for setting a focal position of laser beams in a laser tool comprising a laser source for producing a laser beam and a collimator that provides a parallel course of the laser beam from the laser source, which is passed through a lens, the method comprising
- arranging the lens within a rotatable spindle, wherein a lens tube that is non-rotatable and has a first end facing towards the laser source and a second end facing towards an optical device is provided, wherein the lens is attached inside the second end of the lens tube and the second end of the lens tube is disposed inside an end of the spindle facing towards the laser source;
- providing a sleeve, wherein the sleeve is positioned between the collimator and the lens tube such that a first end of the sleeve faces toward the collimator and a second end of the sleeve faces toward, and is non-rotatably attached directly to, the first end of the lens tube;
- providing a centering device for moving the collimator in an X-Y plane that is perpendicular to the laser beam, the centering device being positioned toward the second end of the collimator and is attached to the first end of the sleeve;
- attaching the optical device to an end of the spindle facing away from the laser source to deflect the laser beam onto a material surface; and
- moving the collimator, the sleeve and the lens tube parallel to the laser beam via a drive,
- wherein at least one parameter is predefined by a controller that controls the movement of the collimator,
- wherein the collimator is moved in a direction of the optical device or opposite to the direction of the optical device as a function of the at least one parameter, and
- wherein the collimator has a first end facing towards the laser source and a second end facing towards the first end of the sleeve.

16. The method according to claim 15, wherein the at least one parameter is a feed of the collimator toward the optical device or a feed of the collimator toward the laser source.

17. The method according to claim 16, wherein the lens is arranged in a fixed position in the lens tube that is attached to the collimator so that the lens follows the movement of the collimator.

* * * * *